United States Patent Office 2,697,122
Patented Dec. 14, 1954

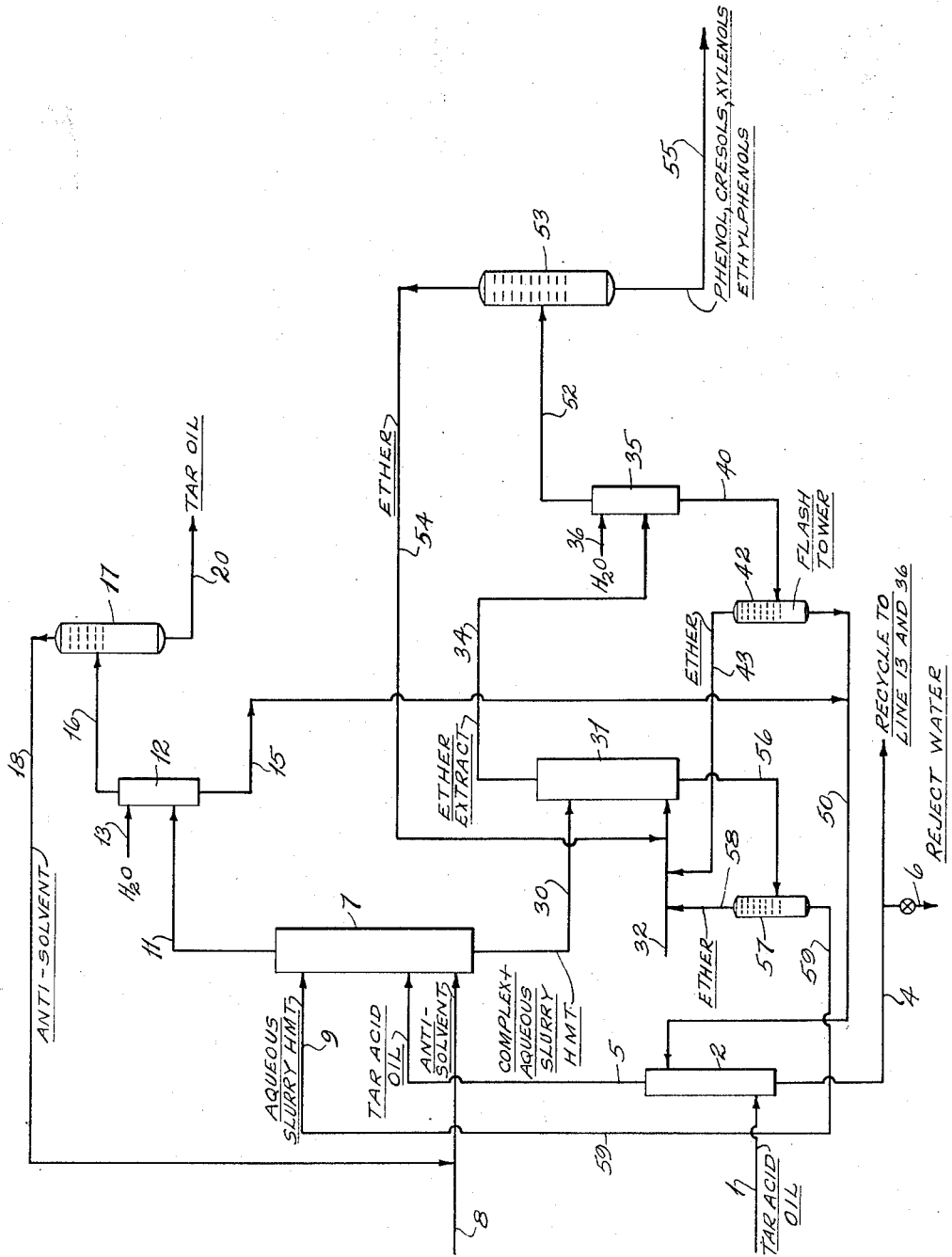

2,697,122

PROCESS FOR ISOLATING PHENOLIC COMPOUNDS FROM MIXTURES THEREOF

Howard V. Hess, Beacon, and George B. Arnold, Glenham, N. Y., assignors to The Texas Company, New York, N. Y., a corporation of Delaware Application May 16, 1951, Serial No. 226,644

4 Claims. (Cl. 260—627)

This invention relates to a novel process for isolating phenolic compounds from mixtures thereof. It is particularly concerned with the isolation of phenol, cresols, ethyl-phenols and xylenols from aromatic mixtures, such as coal tar, which are commercial sources of such compounds.

This application is a continuation-in-part of our copending application, Serial No. 176,661, filed July 29, 1950 entitled Process for Isolating Phenolic Compounds From Mixtures Thereof, now U. S. Patent No. 2,618,664, issued November 18, 1952, wherein there is disclosed a novel process for isolating low molecular weight phenolic compounds from crude mixtures. The novel process of the parent application involves contacting a phenolic compound-containing mixture with aqueous hexamethylene tetramine in the presence of an anti-solvent whereby there is formed a liquid complex phase which is insoluble in the anti-solvent solution of crude mixture; the liquid complex phase, which comprises complexes of hexamethylene tetramine with phenol, cresols, ethylphenols and xylenols, separates from the anti-solvent solution of crude mixture and is decomposed into its components by contact with an oxygenated hydrocarbon solvent such as ethyl ether. A paraffinic hydrocarbon or a mixture of paraffinic hydrocarbons is employed as the anti-solvent. The process of the subject application comprises an improvement in the process of the parent application whereby increased yields of isolated phenolic compounds are obtained and whereby recovery of used hexamethylene tetramine is expedited. The process of the subject application results in substantial economies in the phenol recovery process of the parent application.

The process of the present invention is directed specifically to the treatment and utilization of water wash solutions obtained in the phenolic compound recovery process employing hexamethylene tetramine as the complexing agent. In accordance with the process of this invention, crude aromatic mixture containing phenolics is contacted with aqueous hexamethylene tetramine in the presence of an anti-solvent with the resulting formation of hexamethylene tetramine-low molecular weight phenol complexes which form a liquid complex phase. The mixture is separated into an anti-solvent solution of tar oil and a two-component phase comprising liquid complex and aqueous hexamethylene tetramine complexing agent. The liquid complex phase either separately or in combination with aqueous complexing agent is decomposed by extraction with an oxygenated hydrocarbon such as ether. Prior to recovery of low molecular weight phenols from the ether-rich extract phase by fractionation, the extract phase is subjected to water washing to free it of dissolved hexamethylene tetramine. In similar fashion, the anti-solvent solution of aromatic oil from which the low molecular weight phenols have been separated is water washed prior to recovery of anti-solvent in order to remove hexamethylene tetramine and dissolved complex. Water washing of both the phenol-containing extract phase and the anti-solvent solution of aromatic oil prior to their further rectification by heat treatment is important because hexamethylene tetramine-phenol complexes are converted into insoluble resins at temperatures above 180° F. The water washes are combined and employed to pretreat crude aromatic mixture. Pretreatment of the crude aromatic mixture with the hexamethylene tetramine-containing water wash solution results in the formation of hexamethylene tetramine-phenol complexes which are soluble in the aromatic mixture and effects a corresponding substantial decrease in the hexamethylene tetramine content of the water wash solutions. The complexes formed during the pretreatment of the aromatic mixture are thrown out of the aromatic mixture on the addition of anti-solvent during the complexing step.

Phenol, cresols and xylenols are important chemicals of commerce and are widely used in the manufacture of resins, dyes, pharmaceuticals and petroleum additives. In recent years the synthetic resin industry has been responsible for an ever increasing demand for phenol, cresols and xylenols to be used in phenolic resins. At the present time the largest source of phenol, cresols and xylenols is coal tar from which over 100 million pounds per year of aromatic hydroxy compounds are obtained. Other potential sources of these low molecular weight phenolic compounds are as follows: the tar produced from by-product coke ovens which contains about 2 to 4 per cent tar acids is a potential source of over 100 million pounds per year of phenolic-type compounds; the tar produced in city gas plants is another potential source of 7 million pounds per year of phenolic-type compounds; shale oil also has a considerable content of phenolic compounds; oils produced by coal hydrogenation and low temperature carbonization are additional potential sources of phenolic compounds.

At the present time isolation of phenolic compounds from coal tar and from other sources is effected by extraction with solvents; solutions of caustic soda, of sodium carbonate and of sodium sulfide, aqueous alcohol, formic acid solution, pyridine sulfate solution are examples of solvents employed in recovery of phenolic compounds. All of these extraction processes involve the use of elaborate equipment and most of them are accomplished by a substantial consumption of chemicals. In general, these extraction processes are very unsatisfactory for separating phenol from oils of low phenol content. In addition, solvent extraction processes do not effect good separation of phenols from aromatic oils. Most of the extraction processes have the inherent difficulty that they leave a small amount of aromatic oil in the tar acid concentrate.

The process of this invention provides an effective means for isolating low molecular weight phenolic compounds, specifically phenol itself, cresols, ethylphenols and xylenols, from crude mixtures of both high and low phenolic content. In addition, phenol, cresols, ethylphenols and xylenols may be separated from higher molecular weight aromatic hydroxy compounds by the process of this invention. The fact that phenol, cresols, ethylphenols and xylenols recovered by the complexing technique of this invention may be immediately used in resin manufacture makes this invention of paramount importance in commercial production of phenols.

It is known that hexamethylene tetramine forms solid complexes with aromatic compounds containing one or more hydroxy groups attached to an aryl nucleus. However, when crude mixtures of phenolic compounds are contacted with hexamethylene tetramine, solid complex formation does not occur. Only when an aromatic fraction containing predominantly phenol alone is used does solid complex formation result. Accordingly, despite the specificity of hexamethylene tetramine as a complexing agent for phenolic compounds, it has not been possible, prior to the disclosure of aforeidentified copending application to take advantage of this complexing action in separating phenolic compounds from crude mixtures containing a variety of phenolic compounds. The process of this invention utilizes the discovery that a phenol-containing mixture contacted with aqueous hexamethylene tetramine is resolved into two liquid phases in the presence of an anti-solvent and provides a commercial process for separating phenol, cresols, ethylphenols and xylenols from crude mixtures, such as coal tar distillates.

An aqueous slurry or solution of hexamethylene tetramine may be employed to contact the anti-solvent solution of aromatic mixtures. It is necessary to employ saturated or near-saturated solutions as the use of dilute hexamethylene tetramine solutions is impractical because the formed complex is decomposed by the extra dissolving power of dilute solutions. For most operations it is preferred to employ an aqueous slurry because its use entails the handling of much smaller volumes than does the use of hexamethylene tetramine solutions. The use of aqueous slurries of hexamethylene tetramine is particularly recommended with aromatic mixtures which possess tar acid contents of 40 to 60 per cent. Ordinarily the slurry employed contains approximately 2 to 5 volumes of water per volume of suspended solid hexamethylene tetramine.

Contact of anti-solvent solution of crude aromatic mixture with aqueous slurry or solution of hexamethylene tetramine results in the formation of three phases unless contact is effected under conditions wherein a very large volume of saturated solution of hexamethylene tetramine is employed per volume of complex-forming low molecular weight phenolic compounds present in the crude mixture to be treated. The uppermost phase comprises anti-solvent solution of aromatic mixture from which low molecular weight phenols have been substantially removed; the intermediate layer comprises mainly liquid complex; the bottom layer comprises aqueous solution or slurry of hexamethylene tetramine containing dissolved complex.

In the exceptional instances wherein a very large excess of hexamethylene tetramine solution per complex-forming content of the crude mixture is employed, there are only formed two phases, the upper phase comprising anti-solvent solution of aromatic mixture from which low molecular weight phenols have been substantially removed, and the lower layer comprising aqueous solution of complex and hexamethylene tetramine. A two-phase system results from contact of aqueous hexamethylene tetramine with anti-solvent solution of phenol-containing mixture when there are employed approximately 10 to 12 volumes of saturated hexamethylene tetramine solution per volume of complex-forming phenols present in the mixture; for example, two phases result when 5 volumes of saturated hexamethylene tetramine solution are contacted with 1 volume of tar oil containing about 50 volume per cent phenols in an equal volume of anti-solvent. Whether a two or three-phase system results from the contact of the aqueous hexamethylene tetramine with anti-solvent solution of aromatic mixture, separation of the complex phase from the treated aromatic mixture is simply effected since a sharp interface exists therebetween.

Only low molecular weight phenolic compounds may be separated from crude aromatic mixtures in accordance with the process of this invention. Phenol itself and phenolic compounds up to and including those homologs containing aliphatic constituents equivalent to two methyl groups are separable from aromatic mixtures by the process of this invention. Phenol itself, cresol isomers, xylenol isomers and ethylphenol isomers, which are separated from aromatic mixtures in accordance with the process of this invention, are by far the most important commercial phenols.

The complexing agent employed in the process of this invention is hexamethylene tetramine, a well-known and commercially available condensation product of formaldehyde and ammonia. Hexamethylene tetramine is employed medicinally under the name of Urotropin.

The anti-solvent whose presence allows separation of a liquid complex layer from the crude aromatic mixture is a paraffinic hydrocarbon which is advantageously an aliphatic hydrocarbon containing 3 to 10 carbon atoms. When normally gaseous aliphatic hydrocarbons, such as propane and butane, are employed as anti-solvents, it is necessary to employ a pressure system. Pentanes and hexanes are particularly preferred anti-solvents since they are easily recovered from the aromatic mixture. Naphthenes such as cyclohexane and cyclopentane are effective anti-solvents. Mixtures of paraffinic hydrocarbons such as straight run naphtha and petrol ether may also be employed as the anti-solvent.

Ordinarily, an equal volume of anti-solvent is added to the aromatic mixture. However, the volume ratio of anti-solvent to crude aromatic mixture may vary between 0.5 and 5 depending upon the concentration of phenolic compounds initially present in the aromatic mixture. In general, if the crude aromatic mixture contains a high percentage of phenolic compounds, volume ratios of anti-solvent to crude aromatic mixture in the lower portion of the range of 0.5 to 5 may be employed whereas higher volume ratios are employed when the phenolic content of the tar acid oil is relatively low. For most purposes, equal volumes give excellent results.

Ordinarily, decomposition of the complex phase is effected in the presence of the aqueous phase which is either a solution or slurry of complexing agent. When the combined complex and aqueous phases are subjected to contact with ether, the complex is decomposed with a liberation of low molecular weight phenols which dissolve in the ether and with the liberation of hexamethylene tetramine which is taken up in the aqueous phase. Decomposition of the complex is advantageously effected by a countercurrent extraction operation wherein the combined complex and aqueous phases are contacted countercurrently with ether with the resulting decomposition of the complex and extraction of liberated low molecular weight phenols in the ether extract. When the complexes decompose in the presence of the aqueous phase there is no solids handling problem since the liberated hexamethylene tetramine dissolves in the aqueous phase.

If the complex phase is decomposed in the absence of the aqueous phase, the liberated hexamethylene tetramine is precipitated as a solid on treatment of the liquid complex phase with ether. The advantages of effecting decomposition in the presence of an aqueous phase are apparent since such treatment eliminates the solids handling problems.

Decomposition of the complex phase may be effected with oxygenated compounds, such as aliphatic ethers and cyclic ethers, and in general with those oxygenated solvents which have a high solvent power for tar acids and a low solvent power for hexamethylene tetramine and for water. In addition, water is a suitable solvent for decomposition of the complex if the tar acids involved in the complex are substantially insoluble in water. Since water decomposes the complex by dissolving the hexamethylene tetramine portion thereof, it is apparent that it may only be employed where the complex phase comprises substantially water-insoluble phenols, such as xylenols and ethylphenols. Particularly preferred solvents are diethyl ether and tetrahydrofurane.

Decomposition of the complex by contact with ether or water is effected at temperatures below 180° F. in order to avoid resin formation. The usual temperatures employed for complex decomposition are in the range of 50 to 120° F. Since there is no advantage to employing higher temperatures for complex decomposition, it is ordinarily effected at atmospheric temperature.

Contact of anti-solvent solution of crude aromatic mixture with aqueous hexamethylene tetramine must be effected at a temperature below 180° F. Ordinarily the contact of aromatic mixture and solid hexamethylene tetramine is effected at temperatures between 50 and 120° F.

Formation of the complexes and separation of the liquid complex phase from the aromatic mixture are apparently not affected by pressure changes. Atmospheric pressure is ordinarily employed in the process of the invention, but both sub-atmospheric and super-atmospheric pressures may be employed. Super-atmospheric pressures are usually employed when the anti-solvent is a normally gaseous hydrocarbon, such as propane or butane.

A number of different procedures may be employed to contact the anti-solvent solution with aromatic oil and aqueous hexamethylene tetramine. A preferred procedure involves countercurrent contact of anti-solvent solution of aromatic oil and aqueous hexamethylene tetramine in a tower. This type system is equivalent to a countercurrent extraction system and results in excellent recovery of low molecular weight phenols from the aromatic oil on unitary contact. Batch-wise operation in mixing vessels equipped with agitators may also be employed but does not possess the efficiency of countercurrent contacting. A contact time adequate to assure substantially complete complex formation is desired; 10 to 20 minutes of contact time has been found adequate for complex formation and separation from the aromatic oil.

Separated complex phase and aqueous slurry are washed with anti-solvent in order to remove dissolved aromatic mixture therefrom. In a countercurrent system this washing is simply effected by introduction of the anti-solvent into the contacting tower at a point below where the aromatic oil is introduced so that complexing and washing are effected in a unitary operation.

The extract phase containing phenol compounds obtained by decomposition of the complex phase is washed with water prior to recovery of phenols in order to remove dissolved hexamethylene tetramine. The volume of wash water is ordinarily equivalent to the volume of the extract solution washed; volume ratios of wash to extract solution between 0.1 and 2 are prescribed. The removal of hexamethylene tetramine from the extract phase prevents resin formation on heat stripping of the decomposition solvent from the phenolic compounds and on their fractionation into individual phenolic components.

The anti-solvent solution of aromatic mixture from which low molecular weight phenols have been separated in the form of a complex, is also water washed to remove dissolved complex and hexamethylene tetramine therefrom prior to recovery of anti-solvent by heat stripping. The volume ratio of wash water to anti-solvent solutions are the same as those specified for washing of the extract phase.

Advantageously water washing of both the extract phase and of the anti-solvent solution are effected countercurrently in a tower. These water washes are combined to give an aqueous solution containing approximately 2 to 5 per cent hexamethylene tetramine.

The combined water washes are employed to pretreat the phenol-containing aromatic oil prior to its contact with an aqueous slurry of complexing agent in the presence of an anti-solvent. Contact of the hexamethylene tetramine-containing water washes with aromatic oil, which is advantageously effected countercurrently, results in the formation of complexes between the low molecular weight phenols in the aromatic oil and the hexamethylene tetramine content of the wash solution. The formed complexes which are soluble in the aromatic oil, are removed from the pretreating zone together with the aromatic oil and introduced into the contact zone wherein contact of aromatic oil with aqueous hexamethylene tetramine is effected in the presence of anti-solvent. The entrained complexes are insoluble in the anti-solvent solution of aromatic oil and separate out therefrom as a portion of the complex phase formed in the complexing zone. The hexamethylene tetramine content of the combined water wash is reduced to less than 1 per cent and substantially less than 0.5 per cent in most instances by its utilization as a pretreating agent.

In the accompanying drawing there is diagrammatically outlined a preferred modification of this invention wherein an anti-solvent solution of feed oil which has been pretreated with the combined hexamethylene tetramine-containing wash solutions is contacted with an aqueous slurry of hexamethylene tetramine in a countercurrent contact tower and the resulting composite of complex phase and aqueous slurry is extracted with ether to decompose the complex and recover low molecular weight phenols.

Tar acid oil obtained from coal tar distillation containing approximately 50 weight per cent tar acids is introduced through a pipe 1 into a pretreating zone 2 wherein it is subjected to countercurrent contact with hexamethylene tetramine-containing water wash solution which is obtained in a manner which will be described hereafter. The water wash solution is introduced into the upper portion of the pretreating zone through a pipe 50. The hexamethylene tetramine content of the wash solution is reduced below 0.5 weight per cent in the pretreating zone. The water solution withdrawn from pretreating zone 2 through pipe 4 is recycled to wash the extract phase and anti-solvent solution as will be described hereafter. A portion of the water phase, equivalent to the water content of the charge tar acid oil is rejected through pipe 6.

As a consequence of contact of the tar acid oil with the water wash solution there are formed tar acid oil-soluble complexes of low molecular weight phenols and hexamethylene tetramine. A pretreated tar acid oil containing dissolved complexes is withdrawn from the upper portion of the pretreating zone 2 through a pipe 5 and is introduced therethrough into the middle portion of a tower 7 which acts as a complexing, separating and washing zone. Approximately an equal volume of pentane anti-solvent is introduced into the lower portion of the tower 7 through a pipe 8. An aqueous slurry of hexamethylene tetramine is introduced into the upper portion of the tower 7 through a pipe 9.

Countercurrent contact of the anti-solvent solution of tar acid oil with the aqueous slurry of hexamethylene tetramine results in the formation of hexamethylene tetramine complexes of phenol, cresols, xylenols, and ethyl phenols. The complexes separate as a third phase which is intermediate in density between the pentane solution of aromatic oil and the aqueous slurry of hexamethylene tetramine and which would form a middle layer in a static system.

There is withdrawn from the upper portion of the tower 7 through a pipe 11 an anti-solvent solution of aromatic oil whose content of tar acids has been substantially reduced. The pentane solution of aromatic oil is introduced into a wash tower 12 wherein it is subjected to countercurrent washing with water which is introduced therein through a pipe 13; water from the pretreating zone 2 is used to wash the pentane solutions. Water washing removes residual hexamethylene tetramine and complex from the pentane solution prior to heat stripping the pentane therefrom and prevents resin formation in the stripping tower and in the further treatment of the aromatic oil. The water wash containing extracted hexamethylene teramine and complex is removed from the wash tower 12 through a pipe 15 and is employed to pretreat the tar acid oil after combination with the wash solution obtained on water-washing the decomposition solvent in a manner which will be described hereafter.

The water-washed pentane solution of aromatic oil is removed from the wash tower 12 through a pipe 16 and is introduced into a tower 17 wherein pentane is removed by stripping. Pentane is taken off overhead through a pipe 18 and is recycled therethrough to pipe 8 through which anti-solvent is introduced into the tower 7.

There is withdrawn from the bottom of the stripping tower 17 through a pipe 20 aromatic oil from which the phenol, cresols, xylenols, and ethyl phenols have been substantially extracted and whose total tar acid content is less than 5 per cent. If further removal of low molecular weight phenolic compounds from this aromatic oil is desired it can be recycled to the contact tower 7. However, the tar acid content can not be lowered below approximately 3 per cent because the process of this invention does not remove high molecular weight phenols. This tar acid oil containing less than 5 weight per cent tar acids is an excellent wood preservative.

The aqueous slurry of hexamethylene tetramine flowing downwardly through the tower 7 and the complex phase are washed free of aromatic impurities by contact with the anti-solvent in the lower portion of the tower 7. The pentane-washed mixture of aqueous hexamethylene tetraamine slurry and liquid complex phase is withdrawn from the tower 7 through a pipe 30 through which it is introduced into a tower 31 wherein it is extracted with ether which is introduced into the tower 31 through a pipe 32. Contact of the composite mixture of complex phase and aqueous slurry with ether effects decomposition of the complex whereby the liberated low molecular weight phenols are dissolved in the ether extract phase and the freed hexamethylene tetramine is suspended in the aqueous slurry. In the drawing, decomposition of the complex phase and extraction of liberated low molecular weight phenols are effected by countercurrent contact of the composite mixture with ether in the tower 31.

The hexamethylene tetramine slurry is withdrawn from tower 31 through a pipe 56 and stripped of ether in stripper 57; stripped ether is recycled to tower 31 through pipe 58. The hexamethylene tetramine slurry is withdrawn from stripper 57 through pipe 59 and is recycled therethrough to contact tower 7.

The ether extract phase containing dissolved low molecular weight phenolic compounds is removed from the upper portion of the tower 31 through a pipe 34 and is introduced into a wash tower 35 wherein it is subjected to countercurrent washing with water which is introduced therein through a pipe 36; the wash water is obtained from pretreating zone 2 through pipe 4. Water washing of the ether extract phase results in removal of dissolved hexamethylene tetramine and complex therefrom. The water wash contains approximately 2 to 4 percent hexamethylene tetramine and is withdrawn from the wash tower 35 through a pipe 40. This wash solution contains ether and is introduced into a stripping column 42 for its removal; stripped ether is recycled through pipe 43 to extraction tower 31.

The water solution from which ether has been flashed is withdrawn from the bottom of the stripping column 42 through a pipe 50 and is combined therein with water solution obtained on washing the pentane solution. The combined water solutions are introduced thereby into the pretreating zone 2 wherein the hexamethylene tetramine content of the wash water solution is substantially reduced by contact with the tar acid oil.

Returning now to the further treatment of the ether extract phase after its water washing in the wash tower 35, it is withdrawn therefrom through a pipe 52 and is introduced into a fractionating tower 53 wherein ether is stripped from the low molecular weight phenols. Ether is taken off from the fractionating tower 63 through a pipe 54 and is recycled therethrough to the extraction tower 31.

Low molecular weight phenols of over 99.5 percent purity are withdrawn from the fractionating tower 53 through a pipe 55. Phenols, cresols, xylenols, and ethyl phenols are included in this fraction which can be resolved into individual components by fractional distillation.

The following example illustrates the process of this invention for recovering phenols, cresols, xylenols, and ethyl phenols from crude aromatic mixtures.

1000 cc. (920 g.) of tar acid oil containing 49.4 weight percent of tar acids and 3.2 weight percent of water is diluted with 2000 cc. of pentane and then contacted with 2000 cc. of a saturated aqueous solution of hexamethylene tetramine for 10 minutes at a temperature of about 80° F. in a stirred vessel. As a result of this contact there is produced a three phase system comprising an oil-rich phase, a complex-rich phase, and an aqueous solution of hexamethylene tetramine and complex. The complex-rich phase and the water rich phase are withdrawn together and subjected to washing with 500 cc. of pentane. The pentane wash is combined with the oil-rich phase and the composite thereby formed is subjected to water washing with 300 cc. of water. On stripping the pentane from the composite, there is obtained 500 grams of tar oil containing 13 weight percent of tar acids. The pentane washed complex-rich and water-rich phases are subjected to extraction with 1500 cc. of ether and the ether extract thereby formed is water washed with 200 cc. of water. The washed ether extract is stripped of ether and there is obtained 383 grams of tar acid concentrate of better than 99.5 percent purity. The water wash obtained on treating the oil-rich phase is combined with that obtained on treating the ether extract and the composite is stripped free from ether. The stripped composite contains 2.5 weight per cent hexamethylene tetramine. This stripped water composite is extracted twice with an equal volume of raw tar acid oil prior to its contact with an aqueous slurry of hexamethylene tetramine in the presence of an anti-solvent and the heximethylene tetramine content of the composite wash solution is reduced to 0.5 weight per cent. The wash solution from the treatment of raw tar acid oil is then used to wash the ether extract phase and the pentane solution.

The improvement of the subject invention can also be employed in the process of our co-pending application Serial No. 176,662 filed July 29, 1950 now U. S. Patent No. 2,618,665 issued November 18, 1952 for separating low molecular weight phenols from crude aromatic mixtures by effecting contact of the aromatic mixture with solid hexamethylene tetramine in the presence of anti-solvent and effecting separation of the treated aromatic mixture into a complex phase and an anti-solvent solution of aromatic oil. In the utilization of the improvement of this invention in the complexing process employing solid hexamethylene tetramine, the wash solutions obtained by water washing the anti-solvent solution of aromatic oil and the extract phase obtained on decomposition of the separated complex phase are employed to pretreat the aromatic oil prior to its contact with solid hexamethylene tetramine in the presence of anti-solvent.

It is apparent from the foregoing example that excellent recovery of low molecular weight phenols from crude aromatic mixtures is realized by the process of this invention. It will be noticed that it is possible to reduce the tar acid content of tar acid oil from approximately 50 percent to approximately 5 percent in once-through operation. Moreover, the residual tar acids in the treated oil are predominantly high molecular weight phenolic compounds which possess a higher molecular weight than xylenol. The high purity of the recovered low molecular weight phenolic compounds is particularly important since it makes phenolic compounds recovered by the process of this invention particularly desirable for resin manufacture.

Although the invention has been described in connection with the separation of low molecular weight phenols from crude aromatic mixtures, it is apparent that the process is equally applicable to the separation of low molecular weight phenols from high molecular weight phenols. Thus, phenol, cresols, xylenols and ethylphenols can be separated from alkyl-substituted phenols whose molecular weight is higher than that of xylenol.

Obviously, many modifications and variations of the invention as hereinbefore set forth may be made without departing from the spirit and scope thereof, and only such limitations should be imposed as are indicated in the appended claims.

We claim:

1. In a process for isolating phenols of the group consisting of phenol, cresols, xylenols and ethylphenols from phenolic compound-containing mixtures by the steps comprising contacting said mixture with hexamethylene tetramine at a temperature below 180° F., separating the formed complex phase from said mixture in the presence of an anti-solvent selected from the group consisting of paraffinic and naphthenic hydrocarbons and mixtures thereof, decomposing said complex into its components by extraction with an oxygenated hydrocarbon having a high solvent power for tar acids and a low solvent power for hexamethylene tetramine and water whereby there is formed an extract phase containing said low molecular weight phenols and an amount of hexomethylene tetramine dissolved therein, the improvement which comprises water washing said extract phase prior to recovery of phenols to form a water wash containing a dilute concentration of hexamethylene tetramine and subjecting said phenol-containing mixture prior to its contact with hexamethylene tetramine to pretreatment with said water wash at a temperature less than 180° F. whereby the hexamethylene tetramine content of said water wash is substantially decreased.

2. In a process for isolating low molecular weight phenols of the group consisting of phenol, cresols, xylenols and ethylphenols from a phenolic compound-containing mixture by the steps comprising contacting said mixture with hexamethylene tetramine in the presence of an anti-solvent selected from the group consisting of paraffinic and naphthenic hydrocarbons and mixtures thereof at a temperature below 180° F. whereby there are formed an anti-solvent solution of said mixture and a distinct complex phase, separating said complex phase from said anti-solvent solution, decomposing said complex into its components by extraction with an oxygenated hydrocarbon having a high solvent power for tar acids and a low solvent power for hexamethylene tetramine and water whereby there is formed an extract phase containing said low molecular weight phenols, the improvement which comprises water washing said anti-solvent solution of said mixture prior to recovery of anti-solvent therefrom to form a dilute aqueous solution of hexamethylene tetramine, water washing said extract phase prior to recovery of phenols therefrom to form a dilute aqueous solution of hexamethylene tetramine, combining said water washes to form a wash mixture containing 2–5% hexamethylene tetramine, and subjecting said phenolic compound-containing mixture prior to contact with said hexamethylene tetramine to pretreatment with wash mixture at a temperature below 180° F. whereby the hexamethylene tetramine content of said wash mixture is substantially decreased.

3. In a process for isolating low molecular weight phenols of the group consisting of phenol, cresols, xylenols and ethylphenols from an aromatic phenolic compound-containing mixture by the steps comprising contacting said mixture with aqueous hexamethylene tetramine in the presence of an anti-solvent selected from the group consisting of paraffinic and naphthenic hydrocarbons and mixtures thereof at a temperature below 180° F. whereby there are formed an anti-solvent solution of said aromatic mixture, a complex phase and an aqueous hexamethylene tetramine phase, separating said complex phase from said anti-solvent solution of aromatic mixture, decomposing said complex into its components by extraction with an oxygenated hydrocarbon having a high solvent power for tar acids and a low solvent power for hexamethylene tetramine and water whereby there is formed an extract phase containing said low molecular weight phenols, the improvement which comprises water washing said anti-solvent solution of said aromatic mixture prior to recovery of anti-solvent therefrom to form a dilute aqueous solution of hexamethylene tetramine, water washing said extract phase prior to recovery of phenols therefrom to form a dilute aqueous solution of hexamethylene tetramine, combining said water washes to form a wash mixture containing 2–5% hexamethylene tetramine and subjecting said phenolic compound-containing aromatic mixture prior to its contact with aqueous hexamethylene tetramine to pretreatment with said wash mixture at a temperature below 180° F. whereby the hexamethylene tetramine content of said wash mixture is substantially decreased.

4. In a process for isolating low molecular weight phenols of the group consisting of phenol, cresols, xylenols, and ethylphenols from an aromatic phenolic compound-containing mixture by the steps comprising contacting said mixture with aqueous hexamethylene tetramine in the presence of an anti-solvent selected from the group consisting of paraffinic and naphthenic hydrocarbons and mixtures thereof at a temperature below 180° F. whereby there are formed an anti-solvent solution of said aromatic mixture, a complex phase and an aqueous hexamethylene tetramine phase, separating said complex phase from said anti-solvent solution of aromatic mixture, decomposing said complex into its components by extraction with an oxygenated hydrocarbon having a high solvent power for tar acids and a low solvent power for hexamethylene tetramine and water whereby there is formed an extract phase containing said low molecular weight phenols, the improvement which comprises water washing said anti-solvent solution of said aromatic mixture prior to recovery of anti-solvent therefrom to form a dilute aqueous solution of hexamethylene tetramine, water washing said extract phase prior to recovery of phenols therefrom to form a dilute aqueous solution of hexamethylene tetramine, combining said water washes to form a wash mixture containing 2–5% hexamethylene tetramine, subjecting said phenolic compound-containing aromatic mixture prior to its contact with aqueous hexamethylene tetramine to pretreatment with said wash mixture at a temperature below 180° F. whereby the hexamethylene tetramine content of said water mixture is substantially reduced and recycling said water mixture after contact with said aromatic mixture to wash said anti-solvent solution and said extract phase.

References Cited in the file of this patent

UNITED STATES PATENTS

| Number | Name | Date |
|---|---|---|
| 1,944,681 | Cooper, Jr. | Jan. 23, 1934 |
| 1,955,023 | Roos et al. | Apr. 17, 1934 |
| 2,618,664 | Hess et al. | Nov. 18, 1952 |
| 2,618,665 | Hess et al. | Nov. 18, 1952 |

OTHER REFERENCES

Harvey et al.: Jour. Ind. Eng. Chem., vol. 13, pages 135–141 (Feb. 1921), 7 pages.